United States Patent
Pillai et al.

(10) Patent No.: US 12,526,740 B2
(45) Date of Patent: Jan. 13, 2026

(54) POWER MANAGEMENT TECHNIQUES FOR POWERING 5G FR1 AND mmWave ANTENNAS FOR DEVICES WITH POE

(71) Applicant: Cisco Technology, Inc., San Jose, CA (US)

(72) Inventors: Hari Pillai, San Jose, CA (US); David M. Prives, Milpitas, CA (US); Phong Ho, Cary, NC (US); Vignesh Rajendran, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 18/177,316

(22) Filed: Mar. 2, 2023

(65) Prior Publication Data
US 2024/0298255 A1 Sep. 5, 2024

(51) Int. Cl.
*H04W 52/02* (2009.01)
*H04L 12/10* (2006.01)
*H04W 88/16* (2009.01)

(52) U.S. Cl.
CPC ......... *H04W 52/0203* (2013.01); *H04L 12/10* (2013.01); *H04W 88/16* (2013.01)

(58) Field of Classification Search
CPC .... H04W 52/0203; H04W 88/16; H04L 12/10
See application file for complete search history.

(56) References Cited

U.S. PATENT DOCUMENTS

| | | | |
|---|---|---|---|
| 8,793,511 B1 | 7/2014 | Bishara | |
| 11,838,210 B2 * | 12/2023 | Williams | H04L 47/122 |
| 2016/0370850 A1 | 12/2016 | Hamdi et al. | |
| 2020/0351792 A1 | 11/2020 | Ghelichi et al. | |
| 2022/0094072 A1 | 3/2022 | Kalavakuru et al. | |
| 2022/0279440 A1 | 9/2022 | Sevindik | |

OTHER PUBLICATIONS

"Power Over Ethernet (POE) Technology for the 5G Generation & Beyond," BISinfotech, BiS Team, Oct. 11, 2021, pp. 1-9.

* cited by examiner

Primary Examiner — Diane D Mizrahi
(74) Attorney, Agent, or Firm — Polsinelli P.C.

(57) ABSTRACT

The present technology includes a device that supports a variety of communication interfaces. In such devices, modes can be configured that balance quality of service (QoS) factors with energy consumption factors. For example, it may not be necessary to keep all interfaces fully powered to support a desired QoS. The present technology is further suited to power-limited environments, such as when a device is a power over Ethernet (PoE) device. As will be addressed herein, a PoE device can negotiate an amount of power that power sourcing equipment (PSE) will provide to the device, and in some environments, the amount of supplied power might be less than an amount of power required to fully operate the PoE device. More specifically, the present technology can pertain to a PoE gateway device having 4G and 5G interfaces (FR1 and FR2).

20 Claims, 5 Drawing Sheets

POWER MANAGEMENT TECHNIQUES FOR POWERING 5G FR1 AND mmWave ANTENNAS FOR DEVICES WITH POE

TECHNICAL FIELD

The present technology pertains to power management in 5G radio units, and more specifically pertains to selecting operating modes based on the power burden of 5G and 4G interfaces and the power available from a power over Ethernet (PoE) supply device.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered limiting of its scope, the principles herein are described and explained with additional specificity and detail through the use of the accompanying drawings in which.

DETAILED DESCRIPTION

Figure 1:
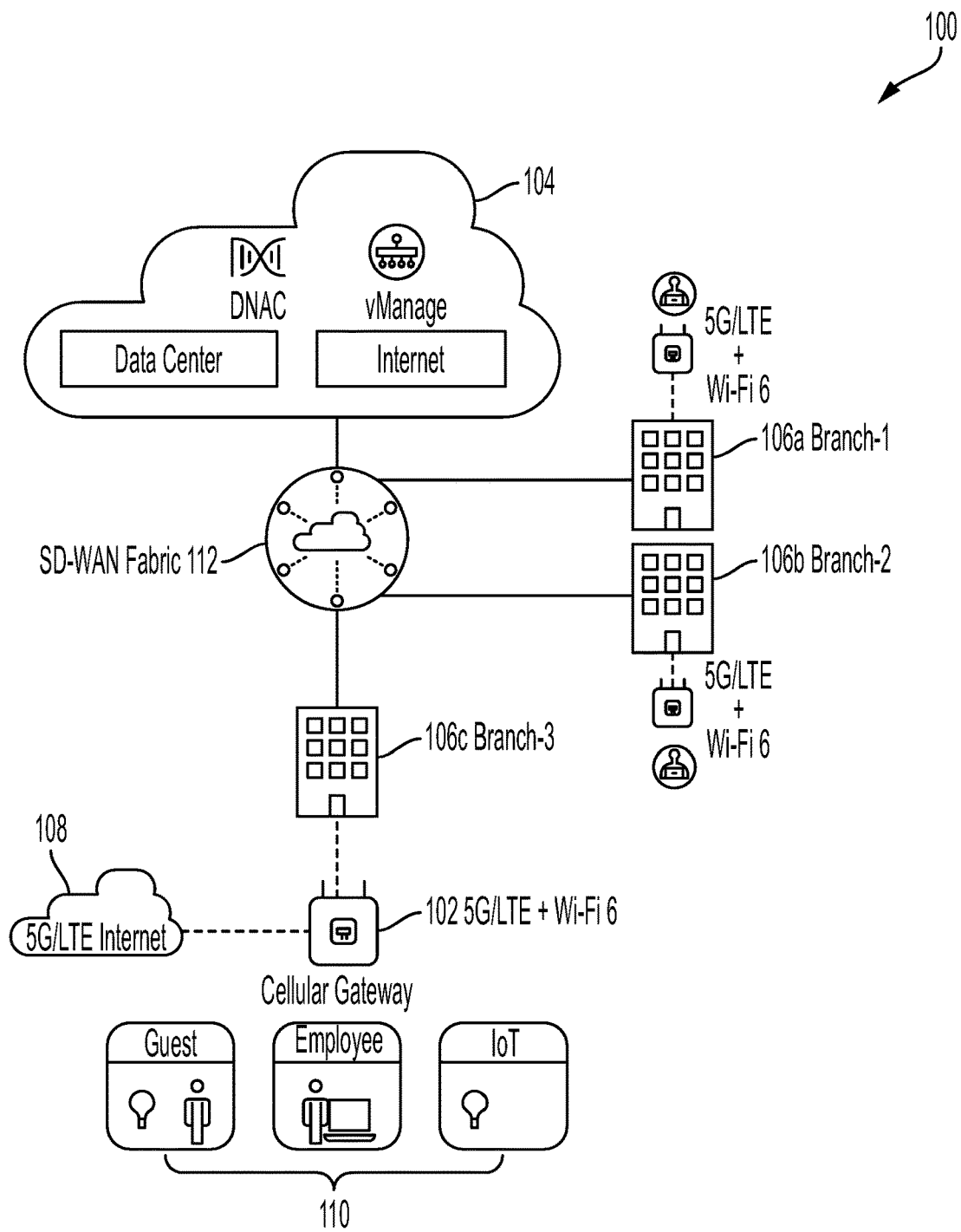
FIG. 1 illustrates an example enterprise network environment in which an example gateway employing the present technology can function in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present technology includes a device that supports a variety of communication interfaces, where the interfaces provide a power burden. In such devices, modes can be configured that balance quality of service (QoS) factors with energy consumption factors. For example, it may not be necessary to keep all interfaces fully powered to support a desired QoS. The present technology is further suited to power-limited environments, such as when a device is powered over Ethernet (PoE). As will be addressed herein, a PoE device can negotiate an amount of power that power sourcing equipment (PSE) will provide to the device, and in some environments, the amount of supplied power might be less than an amount of power required to fully operate the PoE device.

More specifically, the present technology can pertain to a gateway device having 4G and 5G interfaces where the gateway device is a PoE device. Generally speaking, transmitting over a 5G interface requires more power than transmitting over a 4G interface. Within the 5G interfaces, there is a frequency range 1 (FR1) interface and frequency range 2 (FR2) interface, also called an mmWave interface. The FR2 interfaces require substantially more power to support because the FR2 interfaces cover a wider range of frequencies. FR1 covers frequency ranges up to 7 GHz, while FR2 covers ranges above 7 GHz through 50 GHz.

Gateways that are powered over Ethernet and that support several power consuming interfaces face multiple power-related challenges. In some environments, there might not be enough power to support all of the communication interfaces supported by the gateway. Power scarcity might be a persistent issue on the network, or power availability might be variable. Since the operating environment for gateways is not uniform or consistent, a need exists in the art to provide a gateway device that can operate in the environments in which it is deployed. Accordingly, the present technology can adapt to power conditions in a network as they change. Another power related challenge is that gateways that support 4G, 5G-FR1, and 5G-FR2 interfaces can support significant bandwidth, but the amount of bandwidth might not be necessary at some times of day. Therefore, even in environments that can supply a maximum amount of power that the gateway can consume, it might be inefficient and environmentally harmful to continue to support all interfaces. Accordingly, the present technology can adapt itself to function in an energy-efficient manner by utilizing the interfaces that can support a desired quality of service (QoS), without powering superfluous interfaces.

In some embodiments, the disclosed technology addresses energy-efficiency issues by operating in several different operating modes and switching between them gracefully depending on the power input. For example, the device can determine an amount of power available in the PoE port through a 5G enabled gateway from power sourcing equipment (PSE). In some embodiments, the device configures its operation using configuration logic and the amount of power available in the PoE port. For example, the configuration logic may contain certain thresholds of power that determine when operations of the system are powered on and operational (e.g., motherboard, modem, FR1, FR2).

In some embodiments, the device can use machine learning algorithms to identify traffic patterns of frequency usage. For example, the machine learning algorithms can identify periods when a majority of devices are utilizing the FR2 interface and require decreased latency and when utilizing the FR1 interface would nominally decrease the latency rate. Switching from a high-power FR2 interface to a low-power FR1 interface during low-traffic periods can decrease energy usage substantially.

In some embodiments, the device can notify the controller of a need to utilize the FR2 interface and request an increase in power to the PoE.

Accordingly, the present technology addresses the problem of deploying a high-energy-consuming device in a power-constrained or power-variable environment by configuring the device to configure itself to the power available to it. Additionally, the present technology addresses the problem of wasted power by configuring the device to operate in a lower power configuration when it can supply a desired QoS in the lower power configuration.

The present technology may also include a gateway that supports FR1 and FR2 (mmWave) 5G interfaces (and also 4G), receives power over Ethernet (PoE), and dynamically enables only the required FR1 or FR2 combinations. Thus, choosing between a FR1, FR2, or a combination of 5G interfaces. Other technical features may be readily apparent to one skilled in the art from the following figures, descriptions, and claims.

Overview

The present technology may include methods, systems, devices, and computer-readable media that further include training a machine learning algorithm to identify data traffic patterns supported by the 5G enabled gateway, classify periods as high utilization periods requiring use of the FR2 interface to support communications using the 5G enabled gateway, classify periods of lower utilization that can be supported by the use of the FR1 interface without the FR2 interface; and applying a trained version of the machine learning algorithm as an input to the configuration logic. In some embodiments, the configuration logic may select a configuration of the 5G interfaces that only utilizes the FR1 interface during the period of lower utilization even if the supplied power is at least equal to a second threshold and the FR2 interface could theoretically be used.

The method may also include communicating, by the 5G enabled gateway, with a power sourcing equipment (PSE) controller to determine the amount of power available to the 5G enabled gateway over a power over Ethernet (PoE) power supply. The 5G enabled gateway communicates to the PSE controller the potential maximum supplied power budget from the PoE and the actual supplied power from the PoE. Additionally, communicating with the PSE controller includes notifying the PSE controller of the maximum power consumption of the 5G enabled gateway and operating, by the 5G enabled gateway, using the supplied power.

The method may also include multiple configurations or operating modes, where the first configuration of the 5G interfaces includes a frequency range 1 (FR1) interface, and the second configuration of the 5G interfaces includes a combination of the FR1 interface and a frequency range 2 (FR2) interface.

The method may also include where the supplied power is at least equal to the second threshold, and the 5G enabled gateway is configured to operate using the second configuration of the 5G interfaces, and the 5G enabled gateway may reconfigure for operation one or more 5G interfaces of the 5G enabled gateway to operate using the first configuration of the 5G interfaces when the supplied power is reduced to the first threshold.

The method may also include receiving, by the 5G enabled gateway, a communication from the PSE controller that the supplied power is to be reduced to the first threshold.

The method may also include where the reduction of the supplied power is a surprise removal of power at the second threshold.

The method may also include the 5G enabled gateway notifying a baseband device to gracefully detach from the FR2 interface.

The method may also include powering off the FR2 interface by the 5G enabled gateway.

The method may also include training a machine learning algorithm to identify data traffic patterns supported by the 5G enabled gateway and to classify periods as high utilization periods (requiring use of the FR2 interface to support communications using the 5G enabled gateway) and periods of lower utilization (can be supported by use of the FR1 interface without the FR2 interface). Further, applying a trained version of the machine learning algorithm as an input to the configuration logic, where the configuration logic selects the first configuration of the 5G interfaces during the period of lower utilization even if the supplied power is at least equal to a second threshold.

The method may also include where the machine learning algorithm is executed by a network controller that influences the configuration of the 5G enabled gateway. Other technical features may be readily apparent to one skilled in the art from the following figures, descriptions, and claims.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example enterprise network environment 100 in which an example gateway 102 employing the present technology can function. The enterprise network environment 100 can include one or more branches 106 (106a, 106b, 106c, . . . 106n) of the network. The branches of the network are connected with one or more network controllers residing in cloud 104 through an SD WAN fabric 112. As illustrated in FIG. 1, the gateway 102 can be part of a network of one of the branch nodes of the enterprise network. The gateway 102 can be used to connect one or more endpoints 110 to other networks 108 (e.g., 5G/LTE networks and/or the Internet) or to the rest of the enterprise network 100.

Figure 2:
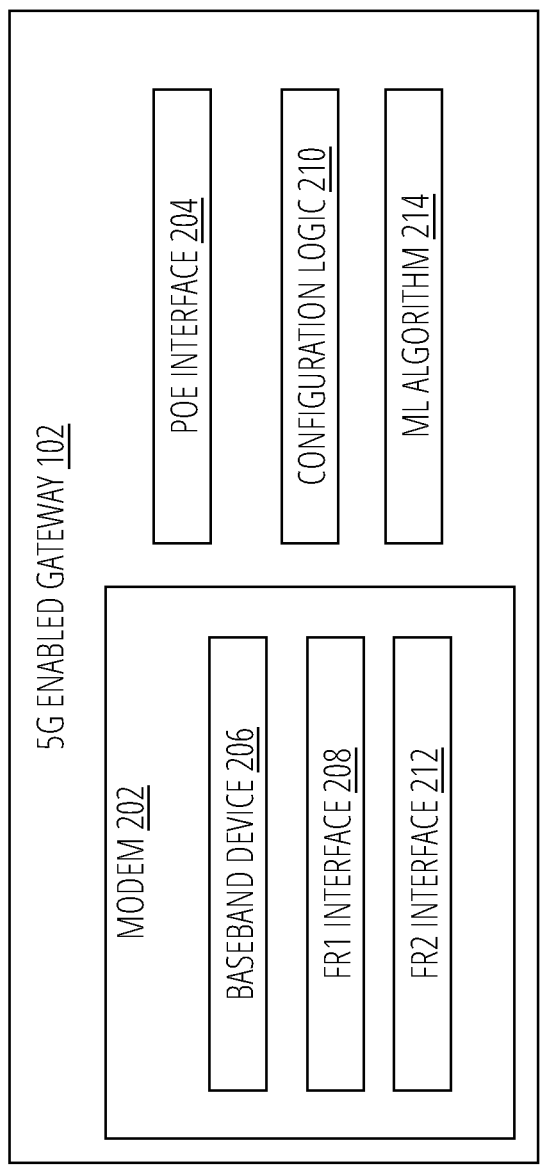
FIG. 2 illustrates an example 5G enabled gateway in accordance with some aspects of the present technology.

FIG. 2 illustrates an example 5G enabled gateway 102. The 5G enabled gateway 102 can include a modem 202, a Power over Ethernet (PoE) interface 204, configuration logic 210, and a machine learning algorithm 214.

The PoE interface 204 can be configured to negotiate with a power sourcing equipment (PSE) controller that supplies power to the 5G enabled gateway 102 using a PoE interface. The PoE interface 204 can be used to negotiate an amount of power to be supplied to the 5G enabled gateway 102. In some embodiments, the PoE interface 204 may negotiate for the maximum amount of power that the 5G enabled gateway 102 is configured to consume. However, in some embodiments, the PoE interface 204 may negotiate for a lower amount of power when it is not desirable for the 5G enabled gateway to keep all of its radio frequency interfaces powered on (e.g, when there are power consumption or environmental concerns).

The configuration logic 210 can receive inputs from the PoE interface 204 indicating an amount of power that is supplied to the 5G enabled gateway 102. Based on the amount of power that is supplied to the 5G enabled gateway 102, the configuration logic 210 can provide instructions to configure the 5G enabled gateway 102 to operate within any limitations imposed on the device by receiving an amount of supplied power that is less than the maximum amount of power that the 5G enabled gateway is configured to consume. For example, the 5G enabled gateway may receive less power from the PSE controller than is needed to power up both the FR1 interface 208 and the FR2 interface 212. The configuration logic 210 can be used to determine whether one or both of the FR1 interface 208 and FR2 interface 212 should be powered.

The machine learning algorithm 214 can be used to receive historical data regarding the operational parameters and utilization of the 5G enabled gateway 102. The machine learning algorithm 214 may use this historical data to learn patterns about the utilization of the 5G enabled gateway by devices connected to the 5G enabled gateway and quality of service (QoS) parameters related to the ability of the 5G enabled gateway to support those connected devices. In some embodiments, the machine learning algorithm 214 can be located at a network controller and/or the gateway. In environments in which the 5G enabled gateway 102 can negotiate for more or less power from the PSE controller, the machine learning algorithm 214 can provide insights about likely future utilization of the 5G enabled gateway 102 to the configuration logic 210 that allows the configuration logic 210 to determine a desired configuration of the 5G enabled gateway 102. For example, if the machine learning algorithm 214 provides insights that the 5G enabled gateway 102 is about to enter a period of high utilization, the configuration logic 210 can cause the PoE interface 204 to negotiate for a higher amount of power so that the 5G enabled gateway can power both its FR1 interface 208 and its FR2 interface 212 in order to supply the desired QoS to the devices that will connect to the 5G enabled gateway 102 during the period of high utilization. In another example, the machine learning algorithm 214 can provide insights that the 5G enabled gateway 102 is about to enter a period of low utilization. The configuration logic 210 can cause the PoE interface 204 to negotiate for a lower amount of power so that the 5G enabled gateway can operate in a power-saving configuration during the period of low utilization.

Figure 3:
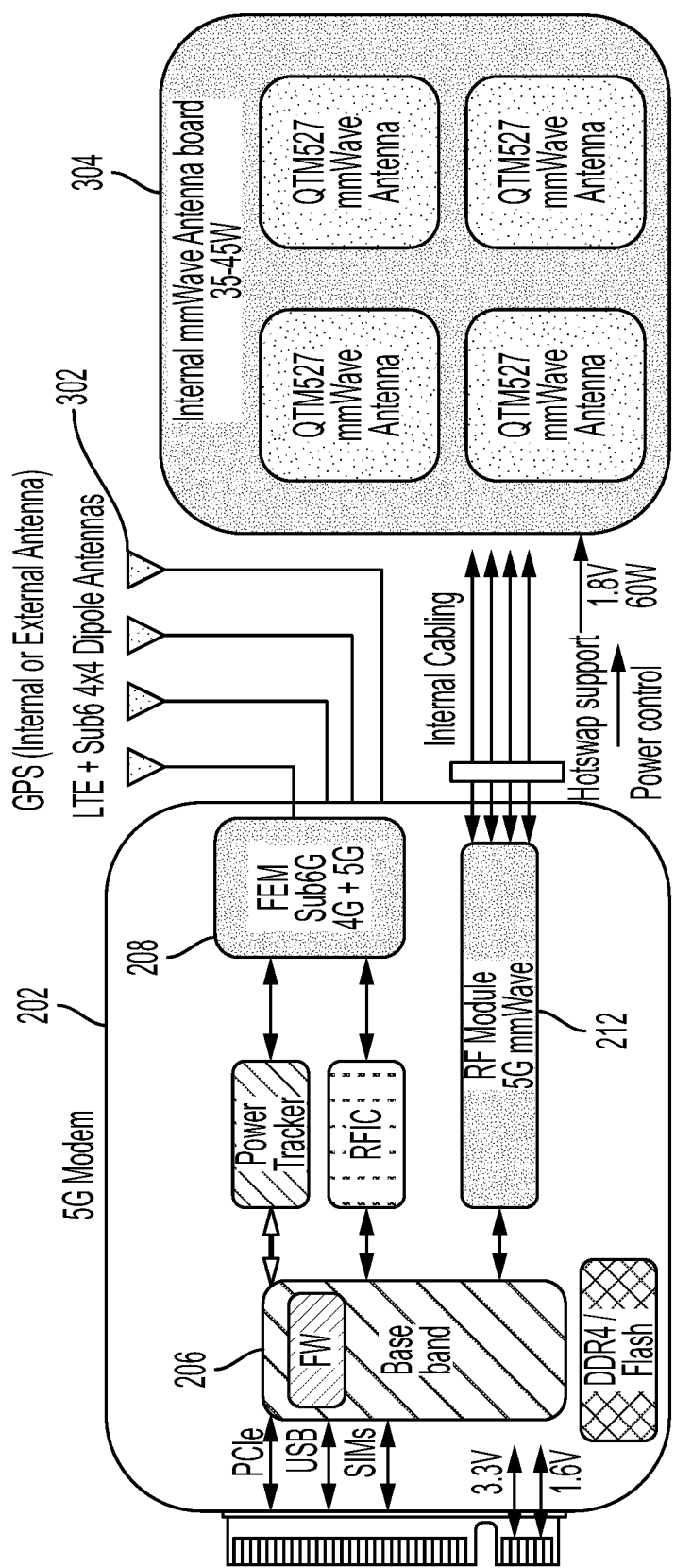
FIG. 3 illustrates an example illustration of a modem of the 5G enabled gateway in accordance with some aspects of the present technology.

FIG. 3 illustrates an example illustration of a modem 202 of the 5G enabled gateway. The modem includes a baseband device 206 that is configured to interface between an Ethernet network and the 5G radio frequency communication interfaces. Within the 5G interfaces, there is a frequency range 1 (FR1) interface 208 and frequency range 2 (FR2) interface 212, also called an mmWave interface. Additionally, the 5G enabled gateway can support 4G communications. 4G covers frequency ranges in the 900-1800 MHz range, while 4G LTE covers frequency ranges up to 6 GHz. FR1 covers frequency ranges up to 7 GHz, while FR2 covers ranges above 7 GHz through 50 GHz. 4G communications cover a lower range of frequency bands, FR1 covers a medium range of frequency bands, and the FR2 covers the largest number of frequency bands. The FR2 interfaces require substantially more power to support because the FR2 interfaces cover a wider range of frequencies.

Since the frequency ranges of 4G communications and 5G communications using FR1 overlap, both of these technologies can utilize the same antenna array as illustrated by the Sub-6 GHz antennas 302. However, 5G communications using FR2 require millimeter wave (mmWave) antennas 304.

Figure 4:
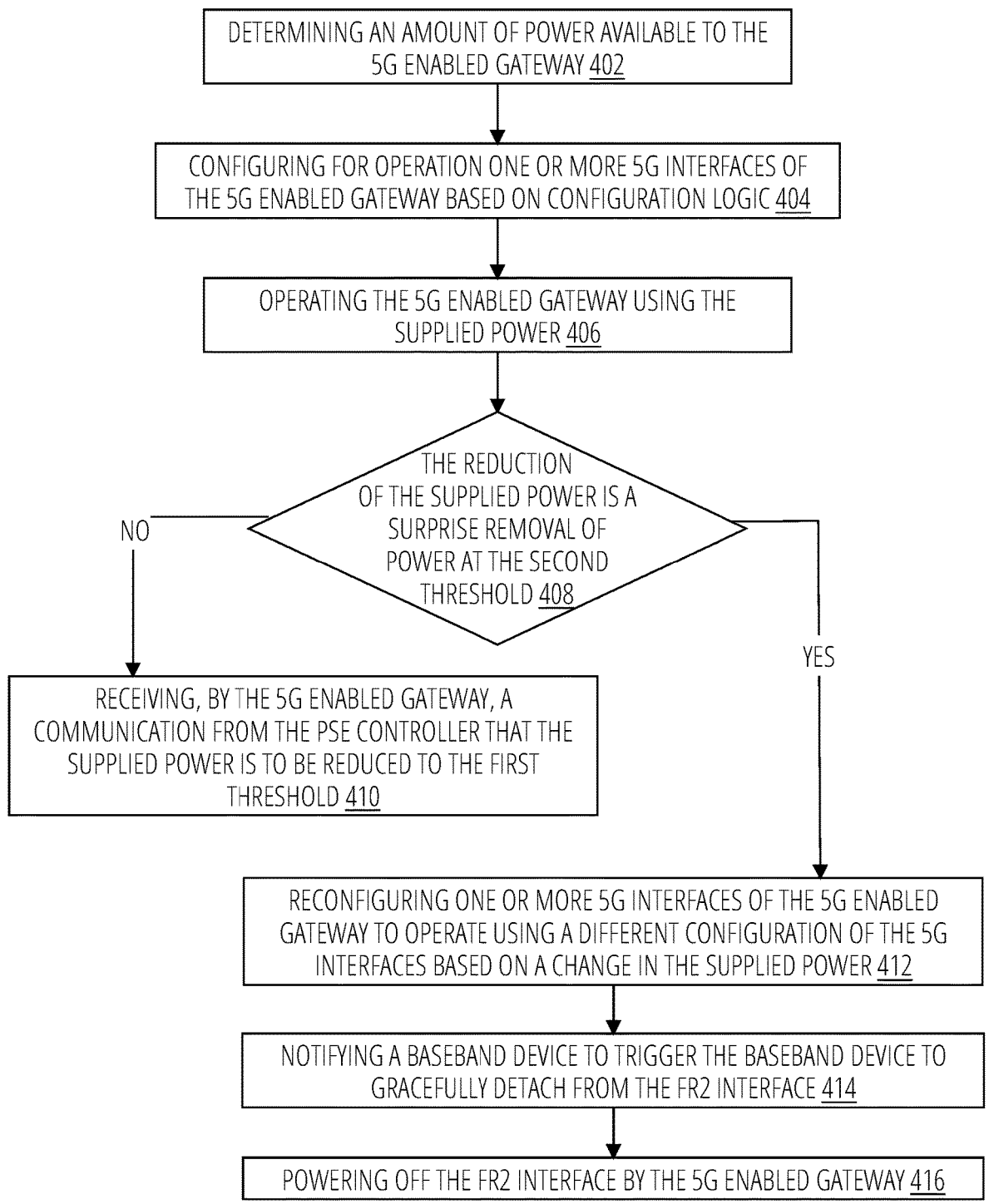
FIG. 4 illustrates an example routine for use by a 5G enabled gateway to identify an operating mode based on an available amount of power and power conservation criteria in accordance with some aspects of the present technology.

FIG. 4 illustrates an example routine for use by a 5G enabled gateway to identify an operating mode based on an available amount of power and power conservation criteria. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

The present technology includes a device that supports a variety of communication interfaces. In such devices, modes can be configured that balance quality of service (QoS) factors with energy consumption factors. For example, it may not be necessary to keep all interfaces fully powered to support a desired QoS. The present technology is further suited to power-limited environments, such as when a device is a power over Ethernet (PoE) device. As will be addressed herein, a PoE device can negotiate an amount of power that power sourcing equipment (PSE) will provide to the device, and in some environments, the amount of supplied power might be less than an amount of power required to fully operate the PoE device. More specifically, the present technology can pertain to a PoE gateway device having 4G and 5G interfaces (FR1 and FR2).

The present technology can dynamically enable a combination of 4G, FR1 or FR2 interfaces to meet power supply conditions in a PoE network and/or to accommodate environmentally-friendly power-saving goals.

According to some examples, the example routine illustrated in FIG. 4 includes determining how much power is available from the PoE for the 5G enabled gateway at block 402. For example, the 5G enabled gateway 102 illustrated in FIG. 1 may determine an amount of power available to the 5G enabled gateway. In some embodiments, this includes communicating with a PSE controller to determine the amount of power available to the 5G enabled gateway over a PoE power supply. The PSE can communicate an amount of power available including a potential maximum supplied power budget, but that the PSE will supply a designated amount of supplied power.

For example, an amount of supplied power might be an amount of supplied power that the PSE can supply at that moment, but it might be able to supply a different amount of power at another time. For example, in a network of devices drawing power from a PoE connection, the PSE might need to supply power to many devices at a time of maximum network utilization, but at other times of the day, the PSE might have additional power to supply or less power to supply.

In some embodiments, communicating with the PSE controller includes notifying the PSE controller of the power consumption of the 5G enabled gateway. For example, the PSE might be able to supply at least the maximum power that the 5G enabled gateway can consume, but the 5G enabled gateway might initially request less power. In such examples, the supplied power can be lower than the potential maximum supplied power budget. In some embodiments, the 5G enabled gateway can also notify the PSE controller if more power is required from the PSE in order to provide a higher QoS.

According to some examples, the example routine includes configuring one or more 5G interfaces of the 5G enabled gateway based on configuration logic at block 404. For example, the 5G enabled gateway may configure various elements of the device to operate based on power thresholds specified in configuration logic. For example, there are at least two thresholds that determine the operating capacity of an FR1 interface and an FR2 interface, respectively. In some embodiments, the configuration logic can receive input from a machine learning algorithm, controller, or the consumer that can be used to determine a configuration of the 5G enabled gateway.

In some embodiments, the configuration logic associates a first configuration of the 5G interfaces when the supplied power is at least equal to a first threshold, and a second configuration of the 5G interfaces when the supplied power is at least equal to a second threshold. The first configuration of the 5G interfaces can include the FR1 interface, and the second configuration of the 5G interfaces can include a combination of the FR1 interface and the FR2 interface. Other configurations are possible including a 4G only configuration or configurations where one or more interfaces are configured to work in lower power modes and, in turn, sacrifice some transmission range.

In some embodiments, the configuration logic can include a mapping of a PoE protocol to a method of operation. For example, if the PSE supplies power using the PoE 802.3af protocol, which supports a maximum of 15.4 watts of supplied power, a gateway with just a 4G interface would not have enough power to support radio frequency functions. In some aspects, a gateway might use 13 watts to power its non-RF systems. In such examples, a gateway can be configured to power up and request more power from the PSE. If the PSE supplies power using the PoE 802.3at protocol, which can supply a maximum of 25.5 watts, it can be possible to support 4G interfaces, but not 5G interfaces. Accordingly, the gateway can configure itself to power the 4G interface. If the PSE supplies power using the CISCO TECHNOLOGIES Universal PoE (UPOE), which can supply up to 90 watts, the gateway will negotiate with the PSE for an initial power supply sufficient to power at least the 5G FR1 interfaces. Thereafter, the gateway will configure itself to support a desired quality of service based on the supply of power negotiated with the PSE. If the gateway can negotiate to receive 51 watts, that will be sufficient to power the FR2 interfaces. If the PSE supplies power using the 802.3bt protocol, the gateway can receive full power (71 watts) to operate the gateway, and at full power, the gateway can configure itself to support all of the interfaces.

While the above paragraph makes reference to various standards, amount of power supplied and configurations of the gateway, these are provided merely for example. In some embodiments, the gateway does not need to map the standard or protocol to its configuration logic. It is sufficient that the gateway can determine the supplied power and configure itself accordingly. Additionally, the present technology is not limited to gateway devices. The principles disclosed herein can be applied to other types of devices capable of operating in multiple power modes.

In some embodiments, the configuration logic can account for other factors beyond the amount of power supplied. For example, the configuration logic can account for various factors, including historical data, consumer preferences, inputs received from a network controller, and QoS desired. In some embodiments, the configuration logic is informed by a machine learning algorithm that is trained using historical data and other data.

According to some examples, the example routine includes operating the 5G enabled gateway using the supplied power at block 406. For example, the 5G enabled gateway 102 may operate the 5G enabled gateway using the supplied power. In some embodiments, the 5G enabled gateway will accept the power supplied by the PoE and begin operation, thus utilizing the configuration logic.

In some embodiments, the gateway can experience a change in the amount of supplied power. In some examples, the supplied power can be a surprise reduction of power. For example, there might be a power outage, an increase in power usage elsewhere, an increase in heat, or a disruption in service from the PSE controller. In some examples, the PSE can notify the gateway of an impending increase or decrease in an amount of supplied power. Accordingly, the example routine can include the 5G enabled gateway determining whether a change in power is a surprise removal of power at decision block 408. The determination made at decision block 408 can be made by detecting that the wattage of the supplied power has changed without first receiving a notification to expect a power change.

According to some examples, when the change in power is not a surprise change, the example routine includes receiving, by the 5G enabled gateway, a communication from the PSE controller that the supplied power is to be reduced to the first threshold at block 410. For example, the 5G enabled gateway 102 may receive a communication from the PSE controller that the supplied power is to be changed. For example, if there are larger power demands elsewhere, the PSE controller will notify the 5G enabled gateway and indicate that power will be reduced to a new supplied level. In another example, the 5G enabled gateway might have previously requested additional power and the PSE controller can communicate that it will increase the amount of supplied power.

According to some examples, the example routine includes reconfiguring one or more 5G interfaces of the 5G enabled gateway to operate using a different configuration of the 5G interfaces based on a change in the supplied power at block 412. For example, the 5G enabled gateway may reconfigure one or more 5G interfaces of the 5G enabled gateway to operate using a different configuration of the 5G interfaces based on a change in the supplied power. For example, the device and 5G enabled gateway could be operating all elements of the device, including both FR1 and FR2 interfaces when the power supply exceeds the second threshold. However, a change in the supplied power could require a change in operation if the supplied power were to drop to the first threshold. As a result, the configuration logic could cause the 5G enabled gateway to cease operation of some elements of the device, including the FR2 interface. For example, the supplied power can start as at least equal to the second threshold and is configured to operate using the second configuration of the 5G interfaces. If the supplied power is reduced to the first threshold, the 5G enabled gateway can be reconfigured to operate using the first configuration of the 5G interfaces in response to the reduction in power.

According to some examples, the method includes notifying a baseband device to trigger the baseband device to gracefully detach from the FR2 interface at block 414. For example, when the 5G enabled gateway is notified about a change in power that will result in deactivation of the 4G, 5G-FR1, or 5G-FR2 interfaces, the 5G enabled gateway may notify a baseband device to trigger the baseband device to gracefully detach from the interface. The baseband device is used to interface between the radio frequency interfaces 4G, 5G-FR1, or 5G-FR2 interfaces with the terrestrial network. For example, the 5G enabled gateway can notify a baseband device to detach from the FR2 interface and elements of the FR1 interface to prepare the baseband device for the discontinuation of support for the FR2 and FR1 interfaces.

According to some examples, the method includes powering off the FR2 interface by the 5G enabled gateway at block 416. For example, the 5G enabled gateway may power off the FR2 interface by the 5G enabled gateway. As another example, the FR2 and the 5G elements of the FR1 may be powered off, resulting in only 4G interfaces active. As another example, the entirety of the 4G, FR1 and FR2 interfaces could be turned off by the 5G enabled gateway and only the motherboard and modem can remain operational.

In some embodiments, the configuration of the gateway can be influenced by additional factors beyond the amount of power supplied to the gateway device. For example, a network controller might instruct the gateway device to operate in a particular mode. This might occur if the gateway device were located indoors or in another location that makes FR2 frequencies less effective. The network controller might also instruct the gateway to adopt a particular configuration in response to the network controller's knowledge about historical network utilization, expected QoS parameters, or enterprise goals such as to save power.

In some embodiments, the gateway can also communicate with a network controller to provide various usage and operational statistics detected by the gateway to inform aspects of the network controller's function.

In some embodiments, a machine learning algorithm can be used to predict utilization of the gateway in a future period, which can be used by the gateway to select a configuration that can support a desired QoS when supporting the predicted utilization. For example, the power consumed by the gateway could differ over time to accomplish environment goals and/or power consumption goals. For example, the gateway could request less power during low-traffic periods (e.g., during night time, over weekends, over holidays, over break periods) and request more power during high-traffic periods (e.g., during working hours, over in-office work days, on weekends). In this illustrative example, the FR1 interface alone would provide sufficient QoS with minimal latency during low-traffic periods, while the FR2 interface would be required to accomplish similar QoS and lack of latency during high-traffic periods.

In some embodiments, a machine learning algorithm would reside within the device itself or share connectivity with the device. In some embodiments, the machine learning algorithm may reside within the device and send notifications to the PSE controller. For example, the machine learning algorithm may determine that only the FR1 interface is necessary during the hours of 8 pm to 4 am and will communicate that to the PSE controller accordingly to alter power supplied to the PoE.

In some embodiments, a machine learning algorithm would reside at the network controller and can be used by the network controller to request configuration changes from the gateway.

Wherever the machine learning algorithm is located, the machine learning algorithm can be trained from analyzing historical use data for the specific gateway or for a greater portion of the network.

Figure 5:
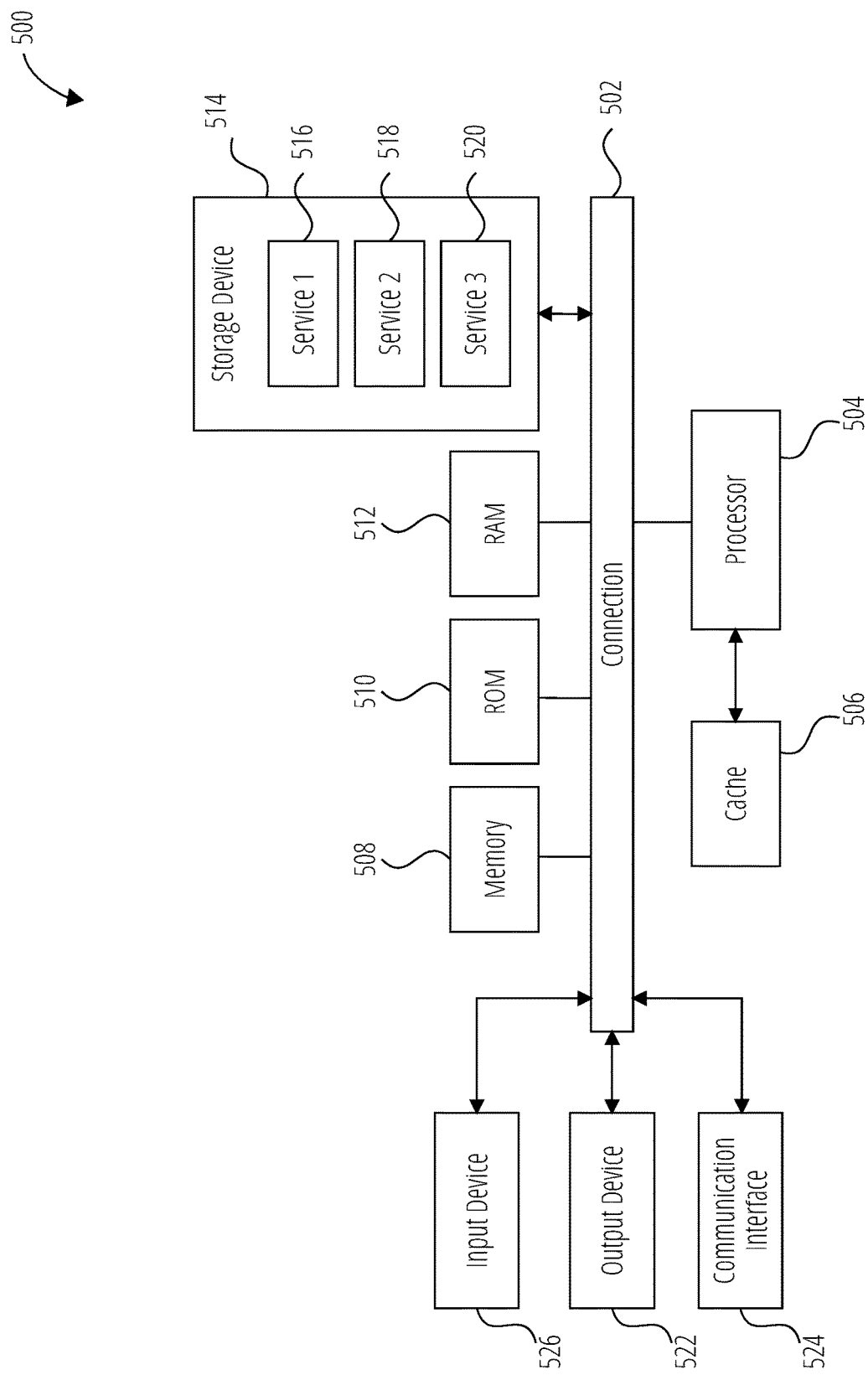
FIG. 5 shows an example of a system for implementing certain aspects of the present technology.

FIG. 5 shows an example of computing system 500, which can be, for example, any computing device making up the 5G enabled gateway 102, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:
   determining, by a 5G enabled gateway, an amount of power available to the 5G enabled gateway, the amount of power available includes a potential maximum supplied power budget and supplied power;
   configuring by the 5G enabled gateway, one or more 5G interfaces of the 5G enabled gateway based on configuration logic that associates a first configuration of the 5G interfaces when the supplied power is at least equal to a first threshold of power capable of powering at least the first configuration, and a second configuration of the 5G interfaces when the supplied power is at least equal to a second threshold of power capable of powering at least the second configuration.

2. The method of claim 1 further comprising:
   communicating, by the 5G enabled gateway, with a power sourcing equipment (PSE) controller to determine the amount of power available to the 5G enabled gateway over a power over Ethernet (POE) power supply, wherein the communicating with the PSE controller includes notifying the PSE controller of a maximum power consumption of the 5G enabled gateway;
   operating, by the 5G enabled gateway, using the supplied power.

3. The method of claim 1, wherein the first configuration of the 5G interfaces includes a frequency range 1 (FR1) interface, and the second configuration of the 5G interfaces includes a combination of the (FR1) interface and a frequency range 2 (FR2) interface.

4. The method of claim 3, wherein the supplied power is at least equal to the second threshold, and the 5G enabled gateway is configured to operate using the second configuration of the 5G interfaces, the method further comprising:
   reconfiguring for operation, by the 5G enabled gateway, the one or more 5G interfaces of the 5G enabled gateway to operate using the first configuration of the 5G interfaces when the supplied power is reduced to the first threshold.

5. The method of claim 4, further comprising:
   receiving, by the 5G enabled gateway, a communication from the PSE controller that the supplied power is to be reduced to the first threshold.

6. The method of claim 4, wherein a reduction of the supplied power is a surprise removal of power at the second threshold.

7. The method of claim 4, further comprising:
   notifying, by the 5G enabled gateway, a baseband device to trigger the baseband device to gracefully detach from the FR2 interface.

8. The method of claim 4, further comprising:
   powering off the FR2 interface by the 5G enabled gateway.

9. The method of claim 3, further comprising:
   training a machine learning algorithm to identify data traffic patterns supported by the 5G enabled gateway and to classify periods as high utilization periods, where use of the FR2 interface to support communications using the 5G enabled gateway is desired and periods of lower utilization can be supported by use of the FR1 interface without the FR2 interface; and
   applying a trained version of the machine learning algorithm as an input to the configuration logic, wherein the configuration logic selects the first configuration of the 5G interfaces during the period of lower utilization even if the supplied power is at least equal to a second threshold.

10. The method of claim 9, wherein the machine learning algorithm is executed by a network controller that influences configuration of the 5G enabled gateway.

11. A system comprising:
    a power over ethernet (POE) microcontroller configured to determine a maximum amount of power available to a 5G enabled gateway, and an amount of supplied power;
    at least one 5G frequency range 1 (FR1) interface;
    at least one 5G frequency range 2 (FR2) interface;
    at least one LTE interface;
    at least one processor configured to enable a first configuration of the FR1 interface and the FR2 interface when the supplied power is at least equal to a first threshold of power capable of powering at least the first configuration, and a second configuration of the FR1 interface and the FR2 interface when the supplied power is at least equal to a second threshold of power capable of powering at least the second configuration.

12. The system of claim 11, wherein the at least one processor is further configured to:
    communicate, by the 5G enabled gateway, with a power sourcing equipment (PSE) controller to determine the amount of power available to the 5G enabled gateway over a power over Ethernet (POE) power supply, the amount of power available includes a potential maximum supplied power budget and the supplied power, wherein the communicating with the PSE controller includes notifying the PSE controller of a maximum power consumption of the 5G enabled gateway; and operate, by the 5G enabled gateway, using the supplied power.

13. The system of claim 11, wherein the first configuration of the 5G interfaces includes a frequency range 1 (FR1) interface, and the second configuration of the 5G interfaces includes a combination of the (FR1) interface and a frequency range 2 (FR2) interface.

14. The system of claim 12, wherein the supplied power is at least equal to the second threshold, and the 5G enabled gateway is configured to operate using the second configuration of the 5G interfaces, wherein the at least one processor is further configured to:

reconfigure for operation, by the 5G enabled gateway, one or more 5G interfaces of the 5G enabled gateway to operate using the first configuration of the 5G interfaces when the supplied power is reduced to the first threshold.

15. The system of claim 14, wherein the at least one processor is further configured to:

notify, by the 5G enabled gateway, a baseband device to trigger the baseband device to gracefully detach from the FR2 interface.

16. The system of claim 11, wherein the at least one processor is further configured to:

train a machine learning algorithm to identify data traffic patterns supported by the 5G enabled gateway and to classify periods as high utilization periods requiring use of the FR2 interface to support communications using the 5G enabled gateway and periods of lower utilization can be supported by use of the FR1 interface without the FR2 interface; and apply a trained version of the machine learning algorithm as an input to the at least one processor, wherein the at least one processor selects the first configuration of the 5G interfaces during the period of the lower utilization even if the supplied power is at least equal to the second threshold.

17. A non-transitory computer-readable storage medium, the computer-readable storage medium including instructions that when executed by a computer, cause the computer to:

determine, by a 5G enabled gateway, an amount of power available to the 5G enabled gateway, the amount of power available includes a potential maximum supplied power budget and supplied power;

configure by the 5G enabled gateway, one or more 5G interfaces of the 5G enabled gateway based on configuration logic that associates a first configuration of the 5G interfaces when the supplied power is at least equal to a first threshold of power capable of powering at least the first configuration, and a second configuration of the 5G interfaces when the supplied power is at least equal to a second threshold of power capable of powering at least the second configuration.

18. The computer-readable storage medium of claim 17:

communicate, by the 5G enabled gateway, with a power sourcing equipment (PSE) controller to determine the amount of power available to the 5G enabled gateway over a power over Ethernet (POE) power supply, wherein the communicating with the PSE controller includes notifying the PSE controller of a maximum power consumption of the 5G enabled gateway;

operate, by the 5G enabled gateway, using the supplied power.

19. The computer-readable storage medium of claim 17, wherein the first configuration of the 5G interfaces includes a frequency range 1 (FR1) interface, and the second configuration of the 5G interfaces includes a combination of the (FR1) interface and a frequency range 2 (FR2) interface.

20. The computer-readable storage medium of claim 18, wherein the supplied power is at least equal to the second threshold, and the 5G enabled gateway is configured to operate using the second configuration of the 5G interfaces, wherein the instructions further configure the computer to:

reconfigure for operation, by the 5G enabled gateway, the one or more 5G interfaces of the 5G enabled gateway to operate using the first configuration of the 5G interfaces when the supplied power is reduced to the first threshold.

* * * * *